US010647202B2

(12) United States Patent
Nishimura et al.

(10) Patent No.: US 10,647,202 B2
(45) Date of Patent: May 12, 2020

(54) HYBRID VEHICLE, CONTROL DEVICE FOR HYBRID VEHICLE AND CONTROL METHOD FOR HYBRID VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Yukimasa Nishimura, Miyoshi (JP); Kazuhiro Oka, Anjo (JP); Yoshizo Akita, Anjo (JP)

(73) Assignees: Toyota Jidosha Kabushiki Kaisha, Toyota-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 335 days.

(21) Appl. No.: 15/825,512

(22) Filed: Nov. 29, 2017

(65) Prior Publication Data
US 2018/0178654 A1    Jun. 28, 2018

(30) Foreign Application Priority Data

Dec. 22, 2016  (JP) ................ 2016-249527

(51) Int. Cl.
| | | |
|---|---|---|
| B60L 3/00 | (2019.01) | |
| B60L 3/04 | (2006.01) | |
| B60W 20/50 | (2016.01) | |
| B60L 50/16 | (2019.01) | |
| B60L 53/24 | (2019.01) | |

(Continued)

(52) U.S. Cl.
CPC ............ *B60L 3/0046* (2013.01); *B60K 6/445* (2013.01); *B60L 3/003* (2013.01); *B60L 3/04* (2013.01); *B60L 50/15* (2019.02); *B60L 50/16* (2019.02); *B60L 53/24* (2019.02); *B60W 10/06* (2013.01); *B60W 10/08* (2013.01); *B60W 20/50* (2013.01); *B60L 2210/14* (2013.01); *B60L 2210/30* (2013.01); *B60L 2220/42* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/549* (2013.01); *B60L 2250/26* (2013.01); *Y02T 10/6239* (2013.01); *Y02T 10/7005* (2013.01); *Y02T 10/7022* (2013.01);

(Continued)

(58) Field of Classification Search
CPC combination set(s) only.
See application file for complete search history.

(56) References Cited

FOREIGN PATENT DOCUMENTS

| | | |
|---|---|---|
| JP | 2004-222362 A | 8/2004 |
| JP | 2008-312306 | 12/2008 |

(Continued)

*Primary Examiner* — Abby Y Lin
*Assistant Examiner* — Renee LaRose
(74) *Attorney, Agent, or Firm* — Finnegan, Henderson, Farabow, Garrett & Dunner, LLP

(57) ABSTRACT

When a boost converter has an abnormality, a battery-less traveling is executed by shutting off a gate of the boost converter and setting a voltage command VH* of a capacitor (high-voltage-system electric power line) to a predetermined voltage VHset higher than a battery voltage VB. Then, during the execution of the battery-less traveling, when it is determined that a charging current has flowed through a battery or when it is determined that the voltage (high-voltage-system voltage) VH of the capacitor has approached the battery voltage VB, it is determined that an upper arm of the boost converter has been short-circuited.

7 Claims, 8 Drawing Sheets

(51) Int. Cl.
*B60L 50/15* (2019.01)
*B60W 10/08* (2006.01)
*B60W 10/06* (2006.01)
*B60K 6/445* (2007.10)

(52) U.S. Cl.
CPC ........ *Y02T 10/7077* (2013.01); *Y02T 10/7225* (2013.01); *Y02T 10/7241* (2013.01)

(56) References Cited

FOREIGN PATENT DOCUMENTS

| | | |
|---|---|---|
| JP | 2013-133041 | 7/2013 |
| JP | 2013-188106 | 9/2013 |
| JP | 2014-103709 A | 6/2014 |
| JP | 2014-184880 A | 10/2014 |
| WO | WO2004/064235 A2 | 7/2004 |

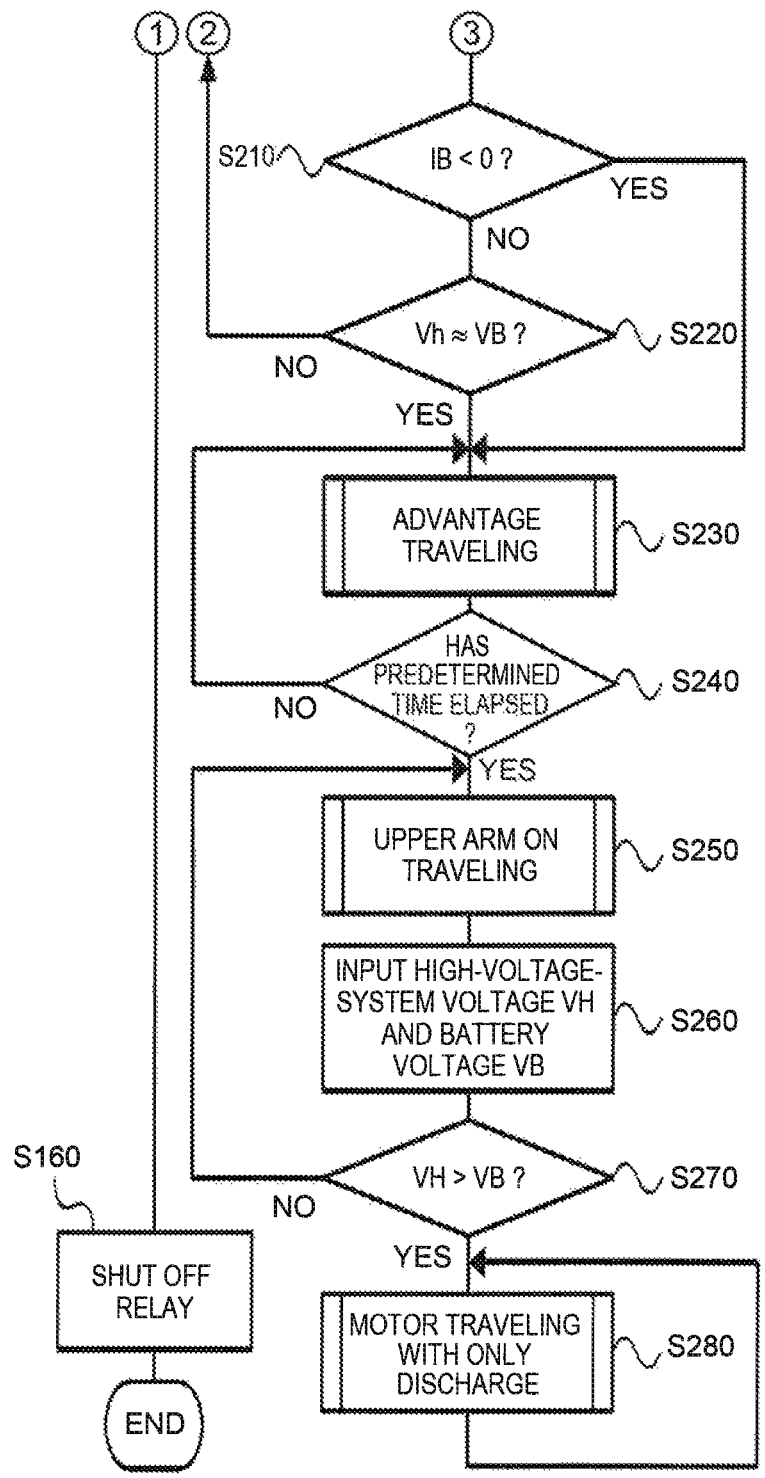

UPPER ARM OF BOOST CONVERTER
HAS NOT BEEN SHORT-CIRCUITED

UPPER ARM OF BOOST CONVERTER
HAS BEEN SHORT-CIRCUITED

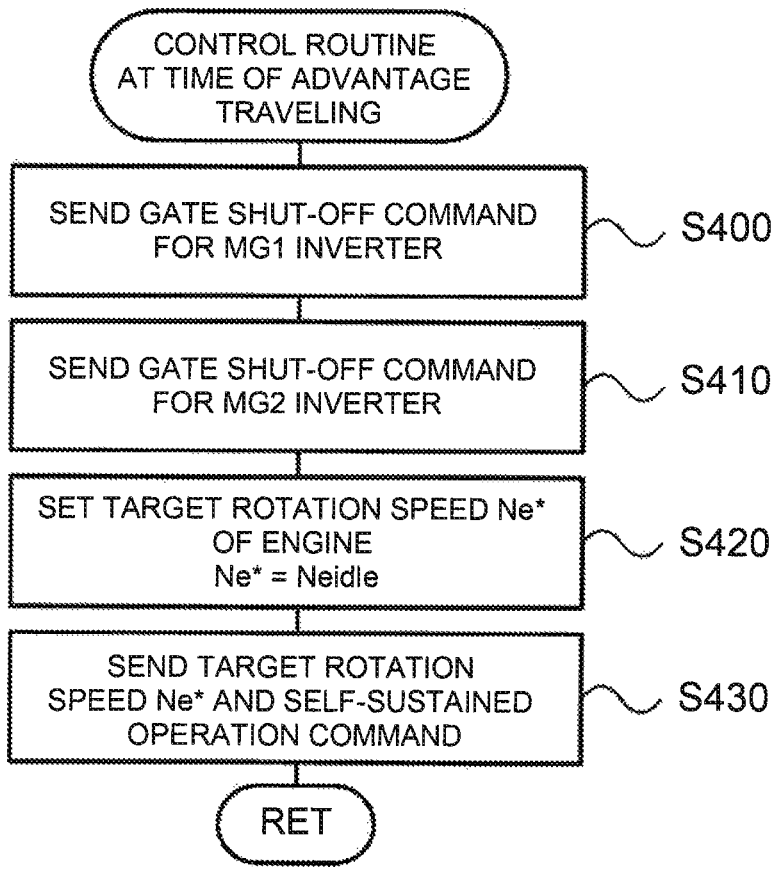

HYBRID VEHICLE, CONTROL DEVICE FOR HYBRID VEHICLE AND CONTROL METHOD FOR HYBRID VEHICLE

INCORPORATION BY REFERENCE

The disclosure of Japanese Patent Application No. 2016-249527 filed on Dec. 22, 2016 including the specification, drawings and abstract is incorporated herein by reference in its entirety.

BACKGROUND

1. Technical Field

The disclosure relates to a hybrid vehicle, and more specifically, relates to a hybrid vehicle including an engine, a first motor, a planetary gear mechanism, a second motor, a first inverter, a second inverter, an electric storage device and a boost converter, a control device for the hybrid vehicle, and a control method for the hybrid vehicle.

2. Description of Related Art

As a hybrid vehicle including a motor for traveling, an inverter to drive the motor, a smoothing capacitor connected to the inverter, and a boost converter connected to a battery and the inverter, a hybrid vehicle that determines a malfunction of an upper arm of the boost converter has been proposed (for example, see Japanese Patent Application Publication No. 2008-312306). This hybrid vehicle determines whether the upper arm of the boost converter has an OFF malfunction (open malfunction), based on whether the voltage of the capacitor is exceeding a threshold. When it is determined that the upper arm has an OFF malfunction, the hybrid vehicle prohibits the charge of the battery, and in this state, drives the motors by the electric power of the battery, to travel in a limp home mode.

SUMMARY

However, for the above-described hybrid vehicle, the determination of whether the upper arm of the boost converter has an open malfunction is described, but the determination of whether the upper arm has a short-circuit malfunction is not mentioned. Since it is not possible to charge the battery when the upper arm of the boost converter has an open malfunction as described above, it is possible to execute the limp home mode with the motors, only in the range of the remaining charged amount of the battery. However, in the case of the short-circuit malfunction of the upper arm of the boost converter, a lower arm is turned off in the state in which the upper arm has been short-circuited. Thereby, although it is not possible to execute the boost of the voltage, it is possible to execute the charge and discharge of the battery, and therefore, it is possible to travel in the limp home mode over a long distance. Accordingly, it is desirable that the short-circuit malfunction of the upper arm of the boost converter can be properly determined.

A hybrid vehicle, a control device for a hybrid vehicle and a control method for a hybrid vehicle in the disclosure have a main object to more properly determine the short-circuit malfunction of the upper arm of the boost converter.

The hybrid vehicle, the control device for the hybrid vehicle and the control method for the hybrid vehicle in the disclosure adopt the following means for achieving the above-described main object.

A first aspect of the disclosure is a hybrid vehicle. The hybrid vehicle includes: an engine; a first motor; a planetary gear mechanism including three rotational elements connected to the engine, the first motor and a drive shaft linked to an axle; a second motor configured to exchange driving power with the drive shaft; a first inverter configured to drive the first motor; a second inverter configured to drive the second motor, the second inverter including a positive bus-bar and a negative bus-bar in common with the first inverter; an electric storage device including a negative electrode terminal connected to the negative bus-bar; a boost converter including a first transistor, a first diode, a second transistor, a second diode and a reactor, the first transistor connected to the positive bus-bar and serving as an upper arm, the first diode connected in parallel to the first transistor in an inverse direction, the second transistor connected to the first transistor and the negative bus-bar and serving as a lower arm, the second diode connected in parallel to the second transistor in an inverse direction, the reactor connected to a positive electrode terminal of the electric storage device and a connection point between the first transistor and the second transistor, the boost converter configured to adjust the voltage on the side of the first inverter and the second inverter to equal to or higher than the voltage on the side of the electric storage device; a smoothing capacitor connected to the positive bus-bar and the negative bus-bar; and an electronic control unit configured to execute a battery-less traveling when the electronic control unit determines that the boost converter has an abnormality, the battery-less traveling being a traveling in which the hybrid vehicle travels while the boost converter is shut off and the first motor and the second motor are driven such that the voltage of the capacitor is higher than the voltage of the electric storage device. The electronic control unit is configured to determine that the upper arm of the boost converter has been short-circuited, when the electronic control unit makes at least one of a determination that the electric storage device has been charged and a determination that the voltage of the capacitor has approached the voltage of the electric storage device, while the electronic control unit is executing the battery-less traveling.

With the above configuration, the hybrid vehicle includes the engine, the first motor, the planetary gear mechanism, the second motor, the first inverter, the second inverter, the electric storage device and the boost converter. When the boost converter has an abnormality, the electronic control unit executes the battery-less traveling in which the hybrid vehicle travels while the boost converter is shut off and the first motor and the second motor are driven such that the voltage of the capacitor is higher than the voltage of the electric storage device. If the upper arm has not been short-circuited, when a gate of the boost converter is shut off, the upper arm is opened and the electric storage device is separated from the first motor and the second motor. Therefore, by the execution of the battery-less traveling, the voltage of the capacitor becomes higher than the voltage of the electric storage device. On the other hand, if the upper arm has been short-circuited, even when the gate of the boost converter is shut off, the upper arm is not opened. Therefore, even when the battery-less traveling is executed such that the voltage of the capacitor is higher than the voltage of the electric storage device, an electric power based on the reverse voltage generated in at least one of the first motor and the second motor is supplied to the electric storage device through the upper arm of the boost converter, so that the electric storage device is charged and the voltage of the capacitor approaches the voltage of the electric storage device. Accordingly, when the electric storage device has been charged or when the voltage of the capacitor has approached the voltage of the electric storage device while the battery-less traveling is being executed, it is determined that the upper arm of the boost converter has been short-circuited, and thereby, it is possible to more properly determine the short-circuit of the upper arm.

In the hybrid vehicle, the electronic control unit may be configured to control the hybrid vehicle to an upper arm ON traveling when the electronic control unit determines that the upper arm of the boost converter has been short-circuited, the upper arm ON traveling being a traveling in which the hybrid vehicle travels with charge and discharge of the electric storage device while the upper arm of the boost converter is in an ON state. With the above configuration, even when the boost converter has an abnormality, the hybrid vehicle can travel in a limp home mode over a relatively long distance, by the upper arm ON traveling with the charge and discharge of the electric storage device.

In the hybrid vehicle, the electronic control unit may be configured to control the hybrid vehicle to the upper arm ON traveling through a traveling state in which gates of the first inverter and the second inverter are shut off and the engine operates in a self-sustained manner, when the electronic control unit determines that the upper arm of the boost converter has been short-circuited. With the above configuration, at the time of the transition from the battery-less traveling to the upper arm ON traveling, it is possible to prevent the output of an undesired driving power to the drive shaft and the failure of power management among the first motor, the second motor and the electric storage device.

In the hybrid vehicle, the electronic control unit may be configured to determine whether the upper arm of the boost converter has been short-circuited, based on the voltage difference between the voltage of the capacitor and the reverse voltage of at least one of the first motor and the second motor, when the electronic control unit determines that the reverse voltage is higher than the voltage of the electric storage device. The electronic control unit may be configured to execute the battery-less traveling and determine whether the upper arm of the boost converter has been short-circuited based on at least one of the determination that the electric storage device has been charged and the determination that the voltage of the capacitor has approached the voltage of the electric storage device, when the electronic control unit determines that the reverse voltage is equal to or lower than the voltage of the electric storage device. With the above configuration, when the reverse voltage of at least one of the first motor and the second motor is higher than the voltage of the electric storage device, it is possible to determine whether the upper arm of the boost converter has been short-circuited, without executing the battery-less traveling. When the reverse voltage is equal to or lower than the voltage of the electric storage device, it is possible to determine whether the upper arm of the boost converter has been short-circuited, by executing the battery-less traveling.

The hybrid vehicle may further include a transmission including an input shaft connected to a rotational element of the planetary gear mechanism and configured to transmit driving power between the input shaft and the drive shaft with change in gear ratio. The input shaft of the transmission may be connected to the second motor. With the above configuration, by changing the gear ratio of the transmission to the high-speed side, the reverse voltage of at least one of the first motor and the second motor becomes lower, and the reverse voltage easily becomes equal to or lower than the voltage of the electric storage device. Therefore, the application of the disclosure becomes more significant.

A second aspect of the disclosure is a control device for a hybrid vehicle. The hybrid vehicle includes: an engine; a first motor; a planetary gear mechanism including three rotational elements connected to the engine, the first motor and a drive shaft linked to an axle; a second motor configured to exchange driving power with the drive shaft; a first inverter configured to drive the first motor, a second inverter configured to drive the second motor, the second inverter including a positive bus-bar and a negative bus-bar in common with the first inverter; an electric storage device including a negative electrode terminal connected to the negative bus-bar; a boost converter including a first transistor, a first diode, a second transistor, a second diode and a reactor, the first transistor connected to the positive bus-bar and serving as an upper arm, the first diode connected in parallel to the first transistor in an inverse direction, the second transistor connected to the first transistor and the negative bus-bar and serving as a lower arm, the second diode connected in parallel to the second transistor in an inverse direction, the reactor connected to a positive electrode terminal of the electric storage device and a connection point between the first transistor and the second transistor, the boost converter configured to adjust the voltage on the side of the first inverter and the second inverter to equal to or higher than the voltage on the side of the electric storage device; a smoothing capacitor connected to the positive bus-bar and the negative bus-bar; and an electrode control unit configured to execute a battery-less traveling when the electronic control unit determines that the boost converter has an abnormality, the battery-less traveling being a traveling in which the hybrid vehicle travels while the boost converter is shut off and the first motor and the second motor are driven such that the voltage of the capacitor is higher than the voltage of the electric storage device. The electronic control unit is configured to determine that the upper arm of the boost converter has been short-circuited, when the electronic control unit makes at least one of a determination that the electric storage device has been charged and a determination that the voltage of the capacitor has approached the voltage of the electric storage device, while the electronic control unit is executing the battery-less traveling.

With the above configuration, the hybrid vehicle includes the engine, the first motor, the planetary gear mechanism, the second motor, the first inverter, the second inverter, the electric storage device and the boost converter. When the boost converter has an abnormality, the electronic control unit executes the battery-less traveling in which the hybrid vehicle travels while the boost converter is shut off and the first motor and the second motor are driven such that the voltage of the capacitor is higher than the voltage of the electric storage device. If the upper arm has not been short-circuited, when a gate of the boost converter is shut off, the upper arm is opened and the electric storage device is separated from the first motor and the second motor. Therefore, by the execution of the battery-less traveling, the voltage of the capacitor becomes higher than the voltage of the electric storage device. On the other hand, if the upper arm has been short-circuited, even when the gate of the boost converter is shut off, the upper arm is not opened. Therefore, even when the battery-less traveling is executed such that the voltage of the capacitor is higher than the voltage of the electric storage device, an electric power based on the reverse voltage generated in the first motor or the second motor is supplied to the electric storage device through the upper arm of the boost converter, so that the electric storage device is charged and the voltage of the capacitor approaches the voltage of the electric storage device. Accordingly, when the electric storage device has been charged or when the voltage of the capacitor has approached the voltage of the electric storage device while the battery-less traveling is being executed, it is determined that the upper arm of the boost converter has been short-circuited, and thereby, it is possible to more properly determine the short-circuit of the upper arm.

A third aspect of the disclosure is a control method for a hybrid vehicle. The hybrid vehicle includes: an engine; a first motor; a planetary gear mechanism including three rotational elements connected to the engine, the first motor and a drive shaft linked to an axle; a second motor configured to exchange driving power with the drive shaft; a first inverter configured to drive the first motor; a second inverter configured to drive the second motor, the second inverter including a positive bus-bar and a negative bus-bar in common with the first inverter; an electric storage device including a negative electrode terminal connected to the negative bus-bar; a boost converter including a first transistor, a first diode, a second transistor, a second diode and a reactor, the first transistor connected to the positive bus-bar and serving as an upper arm, the first diode connected in parallel to the first transistor in an inverse direction, the second transistor connected to the first transistor and the negative bus-bar and serving as a lower arm, the second diode connected in parallel to the second transistor in an inverse direction, the reactor connected to a positive electrode terminal of the electric storage device and a connection point between the first transistor and the second transistor, the boost converter configured to adjust the voltage on the side of the first inverter and the second inverter to equal to or higher than the voltage on the side of the electric storage device; a smoothing capacitor connected to the positive bus-bar and the negative bus-bar; and an electronic control unit. The control method includes: executing, by the electronic control unit, a battery-less traveling when the electronic control unit determines that the boost converter has an abnormality, the battery-less traveling being a traveling in which the hybrid vehicle travels while the boost converter is shut off and the first motor and the second motor are driven such that the voltage of the capacitor is higher than the voltage of the electric storage device; and determining, by the electronic control unit, that the upper arm of the boost converter has been short-circuited, when the electronic control unit makes at least one of a determination that the electric storage device is being charged and a determination that the voltage of the capacitor is close to the voltage of the electric storage device, while the electronic control unit is executing the battery-less traveling.

With the above configuration, the hybrid vehicle includes the engine, the first motor, the planetary gear mechanism, the second motor, the first inverter, the second inverter, the electric storage device and the boost converter. When the boost converter has an abnormality, the electronic control unit executes the battery-less traveling in which the hybrid vehicle travels while the boost converter is shut off and the first motor and the second motor are driven such that the voltage of the capacitor is higher than the voltage of the electric storage device. If the upper arm has not been short-circuited, when a gate of the boost converter is shut off, the upper arm is opened and the electric storage device is separated from the first motor and the second motor. Therefore, by the execution of the battery-less traveling, the voltage of the capacitor becomes higher than the voltage of the electric storage device. On the other hand, if the upper arm has been short-circuited, even when the gate of the boost converter is shut off, the upper arm is not opened. Therefore, even when the battery-less traveling is executed such that the voltage of the capacitor is higher than the voltage of the electric storage device, an electric power based on the reverse voltage generated in the first motor or the second motor is supplied to the electric storage device through the upper arm of the boost converter, so that the electric storage device is charged and the voltage of the capacitor approaches the voltage of the electric storage device. Accordingly, when the electric storage device has been charged or when the voltage of the capacitor has approached the voltage of the electric storage device while the battery-less traveling is being executed, it is determined that the upper arm of the boost converter has been short-circuited, and thereby, it is possible to more properly determine the short-circuit of the upper arm.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3B is a flowchart showing an exemplary control routine at the time of an abnormality of the boost converter;

FIG. 6 is a flowchart showing an exemplary control routine at the time of an advantage traveling; and FIG. 7 is an explanatory diagram showing control methods for the motors MG1, MG2 and an engine in respective limp home modes.

DETAILED DESCRIPTION OF EMBODIMENTS

Next, a mode for carrying out the disclosure will be described with use of an embodiment.

Figure 1:
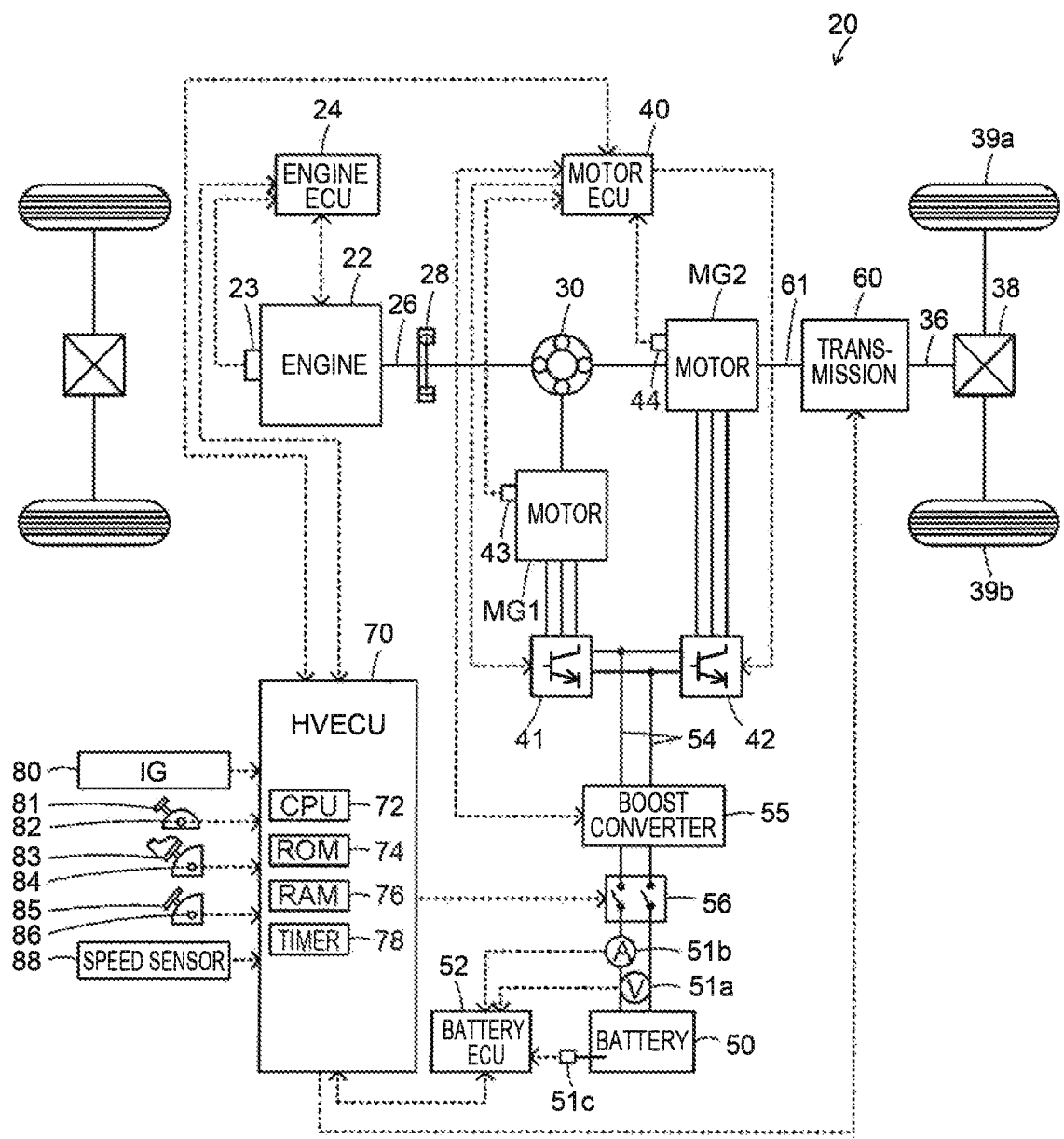
FIG. 1 is a configuration diagram showing a schematic configuration of a hybrid vehicle 20 according to an embodiment of the disclosure.
Figure 2:
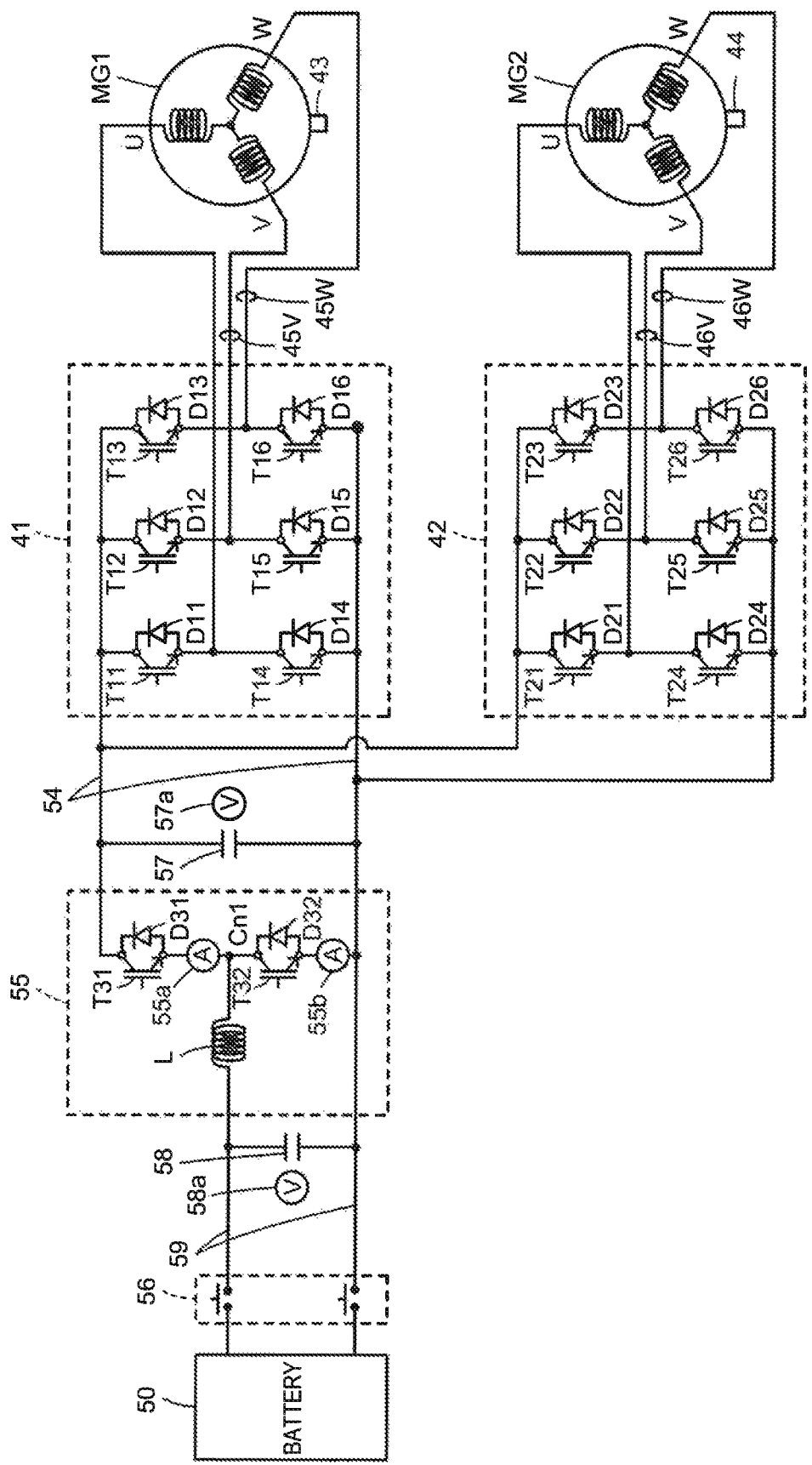
FIG. 2 is a configuration diagram of an electric drive system including motors MG1, MG2, inverters 41, 42 and a boost converter 55.

FIG. 1 is a configuration diagram showing a schematic configuration of a hybrid vehicle 20 according to an embodiment of the disclosure, and FIG. 2 is a configuration diagram of an electric drive system including motors MG1, MG2, inverters 41, 42 and a boost converter 55. As illustrated, the hybrid vehicle 20 according to the embodiment includes an engine 22, a planetary gear 30, motors MG1, MG2, inverters 41, 42, a battery 50, a boost converter 55, a transmission 60, and a hybrid-vehicle electronic control unit (hereinafter, referred to as an "HV ECU") 70.

The engine 22 is configured as an internal combustion engine that outputs driving power using gasoline, diesel oil or the like as fuel. The engine 22 is operated and controlled by an engine electronic control unit (hereinafter, "engine ECU") 24. The engine ECU 24 calculates a rotation speed of a crankshaft 26, that is, a rotation speed Ne of the engine 22, based on a crank angle θcr from a crank position sensor 23.

The planetary gear 30 is configured as a single pinion type planetary gear mechanism. A rotor of the motor MG1 is connected to a sun gear of the planetary gear 30. An input shaft 61 of the transmission 60 is connected to a ring gear of the planetary gear 30. The crankshaft 26 of the engine 22 is connected to a carrier of the planetary gear 30 through a damper 28.

The transmission 60 includes the input shaft 61 connected to the ring gear of the planetary gear 30 and an output shaft (a drive shaft 36) linked to drive wheels 39a, 39b through a differential gear 38, and is configured as a stepped transmission (for example, a four-speed stepped transmission) that transmits driving power between the input shaft 61 and the output shaft with the change in gear ratio.

The motor MG1 is configured as a synchronous generator-motor including a rotor in which a permanent magnet is buried and a stator around which a three-phase coil is wound. As described above, the rotor of the motor MG1 is connected to the sun gear of the planetary gear 30. The motor MG2 is configured as a synchronous generator-motor that is the same as the motor MG1. The rotor of the motor MG2 is connected to the input shaft 61 of the transmission 60.

The inverter 41 is connected to the motor MG1 and a high-voltage-system electric power line 54. As shown in FIG. 2, the inverter 41 includes six transistors T11 to T16 and six diodes D11 to D16. The transistors T11 to T16 are disposed in pairs. In each pair, one transistor is a source side and the other transistor is a sink side with respect to a positive bus-bar and a negative bus-bar of the high-voltage-system electric power line 54. The six diodes D11 to D16 are respectively connected in parallel to the transistors T11 to T16, in the inverse direction. The phases (U-phase, V-phase, W-phase) of the three-phase coil of the motor MG1 are respectively connected to connection points of the transistor pairs of the transistors T11 to T16. Accordingly, when a voltage is applied to the inverter 41, an ON-time ratio for the pairs of the transistors T11 to T16 is regulated by a motor electronic control unit (hereinafter, referred to as a motor ECU) 40, and thereby, a rotating magnetic field is formed in the three-phase coil, so that the motor MG1 is driven to rotate. Further, a smoothing capacitor 57 is connected to the positive bus-bar and negative bus-bar of the high-voltage-system electric power line 54.

Similarly to the inverter 41, the inverter 42 includes six transistors T21 to T26 and six diodes D21 to D26. When a voltage is applied to the inverter 42, an ON-time ratio for the pairs of the transistors T21 to T26 is regulated by the motor ECU 40, and thereby, a rotating magnetic field is formed in the three-phase coil, so that the motor MG2 is driven to rotate.

The boost converter 55 is connected to the high-voltage-system electric power line 54 to which the inverters 41, 42 are connected and a low-voltage-system electric power line 59 to which a battery 50 is connected through a system main relay 56. The boost converter 55 includes two transistors T31, T32, two diodes D31, D32, and a reactor L. The transistor T31 is connected to the positive bus-bar of the high-voltage-system electric power line 54. The transistor T32 is connected to the transistor T31 and negative bus-bars of the high-voltage-system electric power line 54 and the low-voltage-system electric power line 59. The two diodes D31, D32 are respectively connected in parallel to the transistors T31, T32, in the inverse direction. The reactor L is connected to a connection point Cn1 between the transistors T31, T32, and a positive bus-bar of the low-voltage-system electric power line 59. In the boost converter 55, an ON-time ratio for the transistors T31, T32 is regulated by the motor ECU 40. Thereby, the electric power of the low-voltage-system electric power line 59 is increased in voltage and is supplied to the high-voltage-system electric power line 54, or the electric power of the high-voltage-system electric power line 54 is decreased in voltage and is supplied to the low-voltage-system electric power line 59. Further, a smoothing capacitor 58 is connected to the positive bus-bar and the negative bus-bar of the low-voltage-system electric power line 59.

The motor ECU 40 is configured as a microprocessor mainly constituted by a CPU, which is not illustrated, and includes a ROM in which a processing program is stored, a RAM in which data is temporarily stored, input and output ports and a communication port, in addition to the CPU. To the motor ECU 40, signals from various sensors necessary to drive and control the motors MG1, MG2 are input through input ports. Examples of the signals to be input to the motor ECU 40 include rotational positions θm1, θm2 from rotational position detection sensors 43, 44 that detect rotational positions of the rotors of the motors MG1, MG2, phase currents from current sensors 45V, 45W, 46V, 46W that detect electric current to flow in the phases of the motors MG1, MG2, a converter current from a current sensor 55a that is attached to an electric power line connecting the positive bus-bar of the high-voltage-system electric power line 54 and the connection point Cn1 of the boost converter 55, a converter current from a current sensor 55b that is attached to an electric power line connecting the connection point Cn1 and the negative bus-bar of the high-voltage-system electric power line 54, a capacitor voltage (a voltage of the high-voltage-system electric power line 54, hereinafter, referred to as a high-voltage-system voltage) VH from a voltage sensor 57a that is attached between terminals of the capacitor 57, and a capacitor voltage (a voltage of the low-voltage-system electric power line 59, hereinafter, referred to as a low-voltage-system voltage) VL from a voltage sensor 58a that is attached between terminals of the capacitor 58. From the motor ECU 40, switching control signals to the transistors T11 to T16, T21 to T26 of the inverters 41, 42, switching control signals to the transistors T31, T32 of the boost converter 55, and the like are output through output ports. The motor ECU 40, which is connected to the HV ECU 70 through the communication port, drives and controls the motors MG1, MG2 based on a control signal from the HV ECU 70, and as necessary, outputs data about the drive states of the motors MG1, MG2, to the HV ECU 70. The motor ECU 40 calculates rotation speeds Nm1, Nm2 of the motors MG1, MG2, based on the rotational positions θm1, θm2 of the rotors of the motors MG1, MG2 from the rotational position detection sensors 43, 44.

The battery 50 is configured as a nickel-hydrogen secondary battery or a lithium-ion secondary battery, and is connected to the low-voltage-system electric power line 59 through the system main relay 56, as described above. The battery 50 is managed by a battery electronic control unit (hereinafter, referred to as a battery ECU) 52.

The battery ECU 52 is configured as a microprocessor mainly constituted by a CPU, which is not illustrated, and includes a ROM in which a processing program is stored, a RAM in which data is temporarily stored, input and output ports and a communication port, in addition to the CPU. To the battery ECU 52, signals from various sensors necessary to manage the battery 50 are input through input ports. Examples of the signals from the various sensors include a battery voltage VB from a voltage sensor 51a that is provided between terminals of the battery 50, a battery current IB (which is negative when the battery 50 is charged) from a current sensor 51b that is attached to an output terminal of the battery 50, and a battery temperature TB from a temperature sensor 51c that is attached to the battery 50. The battery ECU 52 is connected to the HV ECU 70 through the communication port. The battery ECU 52, as necessary, outputs data about the state of the battery 50, to the HV ECU 70. For managing the battery 50, the battery ECU 52 calculates a state-of-charge SOC, based on an integrated value of the battery current IB. The state-of-charge SOC is the ratio of the quantity of dischargeable electric power to the full capacity of the battery 50. Further, the battery ECU 52 calculates input and output limits Win, Wout, which are the maximum values of electric power with which the battery 50 can be charged and discharged, based on the state-of-charge SOC and the battery temperature TB.

The HV ECU 70 is configured as a microprocessor mainly constituted by a CPU 72, and includes a ROM 74 in which a processing program is stored, a RAM 76 in which data is temporarily stored, a timer 78 that measures time, input and output ports, and a communication port, in addition to the CPU 72. To the HV ECU 70, signals from various sensors are input through input ports. Example of the signals from the various sensors include an ignition signal from an ignition switch 80, a shift position SP from a shift position sensor 82 that detects an operation position of a shift lever 81, an accelerator operation amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a speed sensor 88. From the HV ECU 70, various control signals are output through output ports. Examples of the various control signals include a control signal to the transmission 60 and a drive signal to the system main relay 56.

The thus configured hybrid vehicle 20 in the embodiment has, as traveling modes, a hybrid traveling mode (HV traveling mode) in which the hybrid vehicle 20 travels with the operation of the engine 22, and an electric traveling mode (EV traveling mode) in which the hybrid vehicle 20 travels with the operation of the engine 22 stopped.

When the hybrid vehicle 20 travels in the EV traveling mode, the HV ECU 70, first, sets a required torque Tout* to be output to the drive shaft 36, based on the accelerator operation amount Acc and the vehicle speed V. Subsequently, a gear ratio Gr of the transmission 60 is calculated by dividing the rotation speed Nm2 of the motor MG2 (the rotation speed of the input shaft 61 of the transmission 60) by a rotation speed Nout of the drive shaft 36, and a required torque Tin* that is required for the input shaft 61 of the transmission 60 is calculated by dividing the required torque Tout* of the drive shaft 36 by the gear ratio Gr of the transmission 60. The rotation speed Nout of the drive shaft 36 can be calculated by multiplying the vehicle speed V by a conversion factor k. Then, a torque command Tm1* of the motor MG1 is set to zero. Next, torque limits Tmax, Tmin as upper and lower limit values of torque that may be input to and output from the motor MG2 are calculated by dividing the input and output limits Win, Wout of the battery 50 by the rotation speed Nm2 of the motor MG2. Subsequently, a torque command Tm2* of the motor MG2 is set to a torque resulting from performing the limitation of the required torque Tin* for the input shaft 61 of the transmission 60 with the torque limits Tmin, Tmax. Then, a voltage command VH* of the high-voltage-system electric power line 54 (the capacitor 57) necessary to drive the motors MG1, MG2 at the torque commands Tm1*, Tm2* and at the rotation speeds Nm1, Nm2 is set. After the respective command values are set in this way, the set torque commands Tm1*, Tm2* of the motors MG1, MG2 and the set voltage command VH* are send to the motor ECU 40. The motor ECU 40 executes switching control of the transistors T1 to T16, T21 to T26 of the inverters 41, 42, such that the motors MG1, MG2 are driven at the torque commands Tm1*, Tm2*. Further, the motor ECU 40 executes switching control of the transistors T31, T32 of the boost converter 55, such that the voltage (the high-voltage-system voltage) VH of the capacitor 57 becomes the voltage command VH*.

When the hybrid vehicle 20 travels in the HV traveling mode, the CPU 72 of the HV ECU 70, first, executes the calculation and setting of the required torque Tout* for the drive shaft 36 (the output shaft of the transmission 60), the gear ratio Gr of the transmission 60, and the required torque Tin* for the input shaft 61 of the transmission 60, similarly to the driving in the EV traveling mode. Subsequently, a required power Pin* that is required for the input shaft 61 of the transmission 60 is calculated by multiplying the required torque Tin* for the input shaft 61 of the transmission 60 by the rotation speed Nm2 of the motor MG2 (the rotation speed for the input shaft 61 of the transmission 60). Then, a required power Pe* that is required for the engine 22 is calculated by subtracting a required charge-discharge power Pb* (a positive value when the battery 50 is discharged) of the battery 50 from the calculated required power Pin*. Next, a target rotation speed Ne* and a target torque Te* of the engine 22 are set using the required power Pe* and an operation line (for example, a fuel efficiency operation line) of the engine 22. Subsequently, the torque command Tm1* of the motor MG1 is set by a rotation speed feedback control for adjusting the rotation speed Ne of the engine 22 to the target rotation speed Ne*. Then, a power that is input to and output from the motor MG1 is calculated by multiplying the set torque command Tm1* and rotation speed Nm1 of the motor MG1, and the torque limits Tmax, Tmin as the upper and lower limit values of torque that may be input to and output from the motor MG2 are calculated by dividing a power resulting from subtracting the power of the motor MG1 from the input and output limits Win, Wout of the battery 50 by the rotation speed Nm2 of the motor MG2. Next, a temporary torque Tm2tmp of the motor MG2 is calculated by subtracting a torque (direct torque) to be output from the motor MG1 when the motor MG1 is driven at the torque command Tm1* and to be applied to the input shaft 61 of the transmission 60 through the planetary gear 30, from the required torque Tin* for the input shaft 61 of the transmission 60. Subsequently, the torque command Tm2* of the motor MG2 is set to a torque resulting from performing the limitation of the temporary torque Tm2tmp of the motor MG2 with the torque limits Tmin, Tmax. Then, the voltage command VH* of the high-voltage-system electric power line 54 (the capacitor 57) necessary to drive the motors MG1, MG2 at the torque commands Tm1*, Tm2* and at the rotation speeds Nm1, Nm2. After the respective command values are set in this way, the target rotation speed Ne* and target torque Te* of the engine 22 are sent to the engine ECU 24, and the torque command Tm1*, Tm2* of the motor MG1, MG2 and the voltage command VH* are sent to the motor ECU 40. The engine ECU 24 executes an intake air amount control, a fuel injection control, an ignition control and the like for the engine 22, such that the engine 22 is operated based on the target rotation speed Ne* and the target torque Te*. The motor ECU 40 executes the switching control of the transistors T11 to T16, T21 to T26 of the inverters 41, 42, such that the motors MG1, MG2 are driven at the torque commands Tm1*, Tm2*. Further, the motor ECU 40 executes the switching control of the transistors T31, T32 of the boost converter 55, such that the voltage (the high-voltage-system voltage) VH of the capacitor 57 becomes the voltage command VH*.

The gear shift control for the transmission 60 is executed by setting a gear stage using the accelerator operation amount Acc, the vehicle speed V and an unillustrated gear shift map and controlling an unillustrated actuator such that the set gear stage is established. In the gear shift map, basically, as the vehicle speed V is higher, a higher-speed side gear stage (gear ratio) is set such that the reduction gear ratio is lower. However, when the accelerator operation amount Acc is high, a low-speed side gear stage at which the reduction gear ratio is high is set even if the vehicle speed V is high, and when the accelerator operation amount Acc is low, a high-speed side gear stage at which the reduction gear ratio is low is set even if the vehicle speed V is low. In the transmission 60 according to the embodiment, at some gear stages, reduction gear ratios having values lower than 1.0, that is, gear ratios at which the rotation speed of the input shaft 61 is relatively lower than the rotation speed Nout of the drive shaft 36 are set.

Figure 3A:
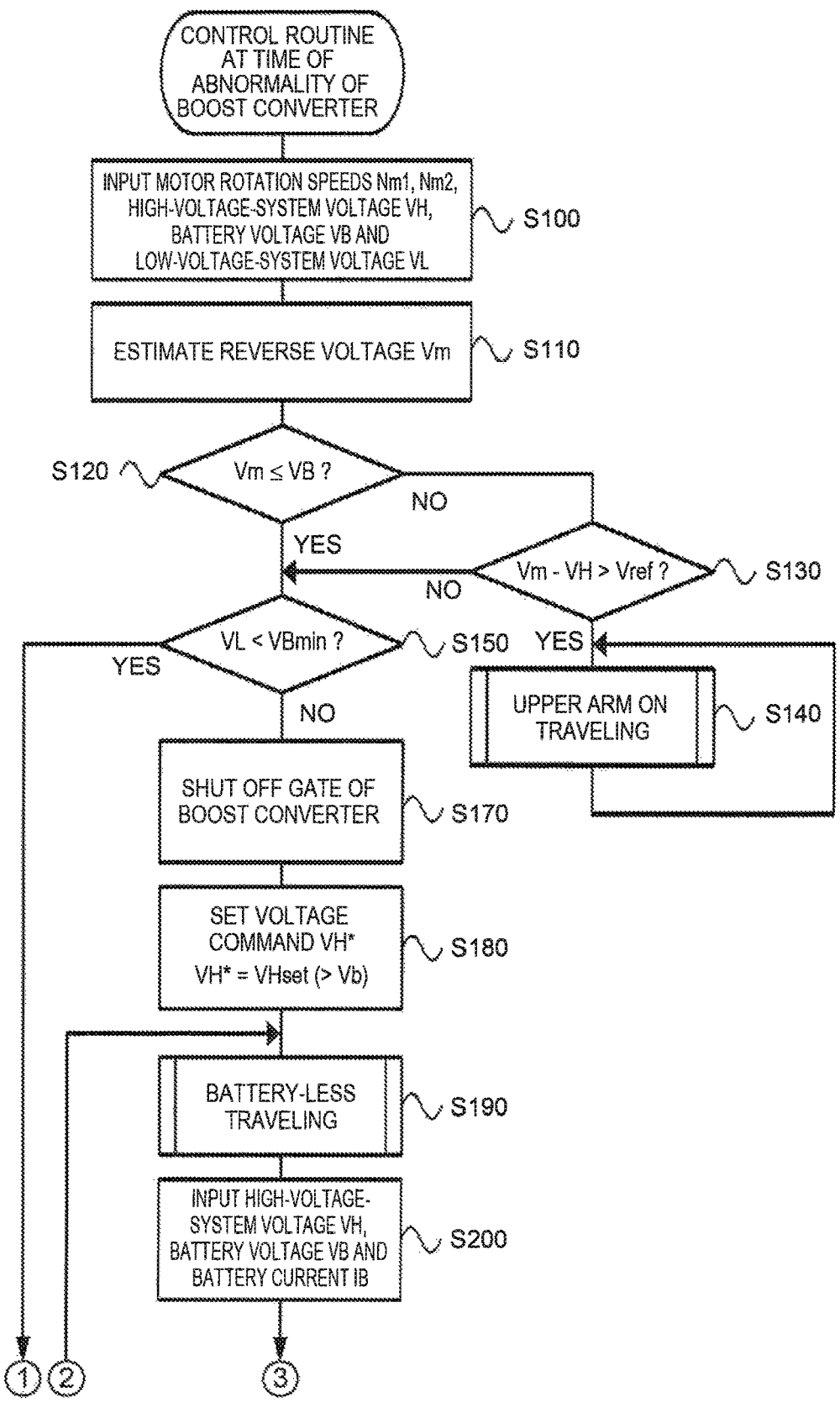
FIG. 3A is a flowchart showing an exemplary control routine at the time of an abnormality of the boost converter.

Next, an operation of the hybrid vehicle 20 when the boost converter 55 has an abnormality will be described. FIG. 3A and FIG. 3B are a flowchart showing an exemplary control routine at the time of an abnormality of the boost converter, and the routine is executed by the HV ECU 70 in the embodiment. The routine is executed when it is determined that the converter current from the current sensor 55a or the current sensor 55b is exceeding a threshold and an excessive current has flowed through the boost converter 55.

When the control routine at the time of the abnormality of the boost converter is executed, the CPU 72 of the HV ECU 70, first, executes a process of inputting data necessary for the control, such as the motor rotation speeds Nm1, Nm2, the high-voltage-system voltage VH, the battery voltage VB and the low-voltage-system voltage VL (step S100). Next, a motor reverse voltage Vm is calculated (step S110). The process of step S110 is executed by estimating a reverse voltage of the motor MG1 based on the motor rotation speed Nm1, estimating a reverse voltage of the motor MG2 based on the motor rotation speed Nmj, and adopting a higher one of the estimated reverse voltage of the motor MG1 and the estimated reverse voltage of the motor MG2, as the motor reverse voltage Vm. Then, it is determined whether the motor reverse voltage Vm is equal to or lower than the battery voltage VB (step S120). If it is determined that the motor reverse voltage Vm is not equal to or lower than the battery voltage VB, that is, the motor reverse voltage Vm is higher than the battery voltage VB, it is determined whether a deviation (Vm−VH) between the motor reverse voltage Vm and the high-voltage-system voltage VH is larger than a threshold Vref (step S130). Here, the threshold Vref is a threshold for determining whether the transistor T31, which is an upper arm of the boost converter 55, has a short-circuit malfunction. Here, suppose that the reverse voltage (the motor reverse voltage Vm) is generated in the motors MG1, MG2. When the reverse voltage is higher than the battery voltage VB, if the upper arm (the transistor T31) of the boost converter 55 is not short-circuited, the electric power based on the reverse voltage of the motors MG1, MG2 is stored in the capacitor 57 on the high-voltage-system electric power line 54, and therefore, the voltage (the high-voltage-system voltage) VH of the capacitor 57 approaches the motor reverse voltage Vm. However, if the upper arm of the boost converter 55 is short-circuited, the electric power based on the reverse voltage of the motors MG1, MG2 is supplied to the battery 50 side through the upper arm of the boost converter 55, so that the battery 50 is charged. Therefore, the voltage (the high-voltage-system voltage) VH of the capacitor 57 approaches the low-voltage-system voltage VL, and moves away from the motor reverse voltage Vm. Accordingly, when the motor reverse voltage Vm is higher than the battery voltage VB, it is possible to determine whether the boost converter 55 has been short-circuited, based on the deviation (Vm−VH) between the motor reverse voltage Vm and the high-voltage-system voltage VH. On the other hand, when the motor reverse voltage Vm is equal to or lower than the battery voltage VB, even if the upper arm of the boost converter 55 has been short-circuited, the electric power based on the reverse voltage of the motors MG1, MG2 is not supplied to the battery 50 side, and therefore, it is not possible to determine the short-circuit malfunction of the boost converter 55 based on the deviation (Vm−VH) between the motor reverse voltage Vm and the high-voltage-system voltage VH. Here, in the hybrid vehicle 20 according to the embodiment, the transmission 60 is interposed between the ring gear of the planetary gear 30 and the drive shaft 36, and the rotor of the motor MG2 is connected to the input shaft 61 of the transmission 60. When the accelerator operation amount Acc is low, the transmission 60 often sets a gear ratio at which the rotation speed of the input shaft 61 (the rotation speed Nm2 of the motor MG2) is lower than the rotation speed Nout of the drive shaft 36. Therefore, in the hybrid vehicle 20 according to the embodiment, unless a driver greatly depresses the accelerator pedal 83, the motors MG1, MG2 are likely to rotate in a low rotation speed region and the motor reverse voltage Vm is likely to be equal to or lower than the battery voltage VB. Accordingly, when the boost converter 55 has an abnormality, it is difficult to determine the short-circuit malfunction of the boost converter 55 based on the deviation (Vm−VH) between the motor reverse voltage Vm and the high-voltage-system voltage VH.

When it is determined in steps S120, S130 that the motor reverse voltage Vm is higher than the battery voltage VB and the deviation (Vm−VH) between the motor reverse voltage Vm and the high-voltage-system voltage VH is larger than the threshold Vref, it is determined that the upper arm of the boost converter 55 has a short-circuit malfunction, and an upper arm ON traveling is executed (step S140). Here, the upper arm ON traveling is executed by keeping the upper arm (the transistor T31) of the boost converter 55 in an ON state such that the battery 50 is directly connected to the high-voltage-system electric power line 54 and controlling the engine 22, the motors MG1, MG2 and the transmission 60 such that the required torque Tout* based on the accelerator operation amount Acc is output to the drive shaft 36. The upper arm ON traveling is executed by the same control as the above-described normal-time control (the control in the EV traveling mode or the HV traveling mode), except that the upper arm of the boost converter 55 is kept in the ON state and the input and output limits Win, Wout of the battery 50 are more strictly limited than at the normal time.

When it is determined in step S120 that the motor reverse voltage Vm is equal to or lower than the battery voltage VB or when it is determined in step S130 that the deviation (Vm−VH) between the motor reverse voltage Vm and the high-voltage-system voltage VH is equal to or smaller than the threshold Vref, it is determined whether the low-voltage-system voltage VL is lower than a lower limit voltage threshold VBmin of the battery 50 (step S150). When the low-voltage-system voltage VL is lower than the lower limit voltage threshold VBmin, it is determined that a lower arm of the boost converter 55 has been short-circuited, the system main relay 56 is turned off (step S160), and the control routine at the time of the abnormality of the boost converter is ended.

On the other hand, when the low-voltage-system voltage VL is equal to or higher than the lower limit voltage threshold VBmin, a gate shut-off command for shutting off the gate of the boost converter 55 is sent to the motor ECU 40 (step S170), the voltage command VH* of the high-voltage-system electric power line 54 (the capacitor 57) is set to a predetermined voltage VHset higher than the battery voltage VB (step S180), and a battery-less traveling is executed (step S190). The battery-less traveling is executed by shutting off the gate of the boost converter 55 such that the battery 50 is separated from the high-voltage-system electric power line 54 (the motors MG1, MG2) and controlling the engine 22, the motors MG1, MG2 and the transmission 60 such that the required torque Tout* based on the accelerator operation amount Acc is output to the drive shaft 36, without charging and discharging the battery 50.

Figure 4:
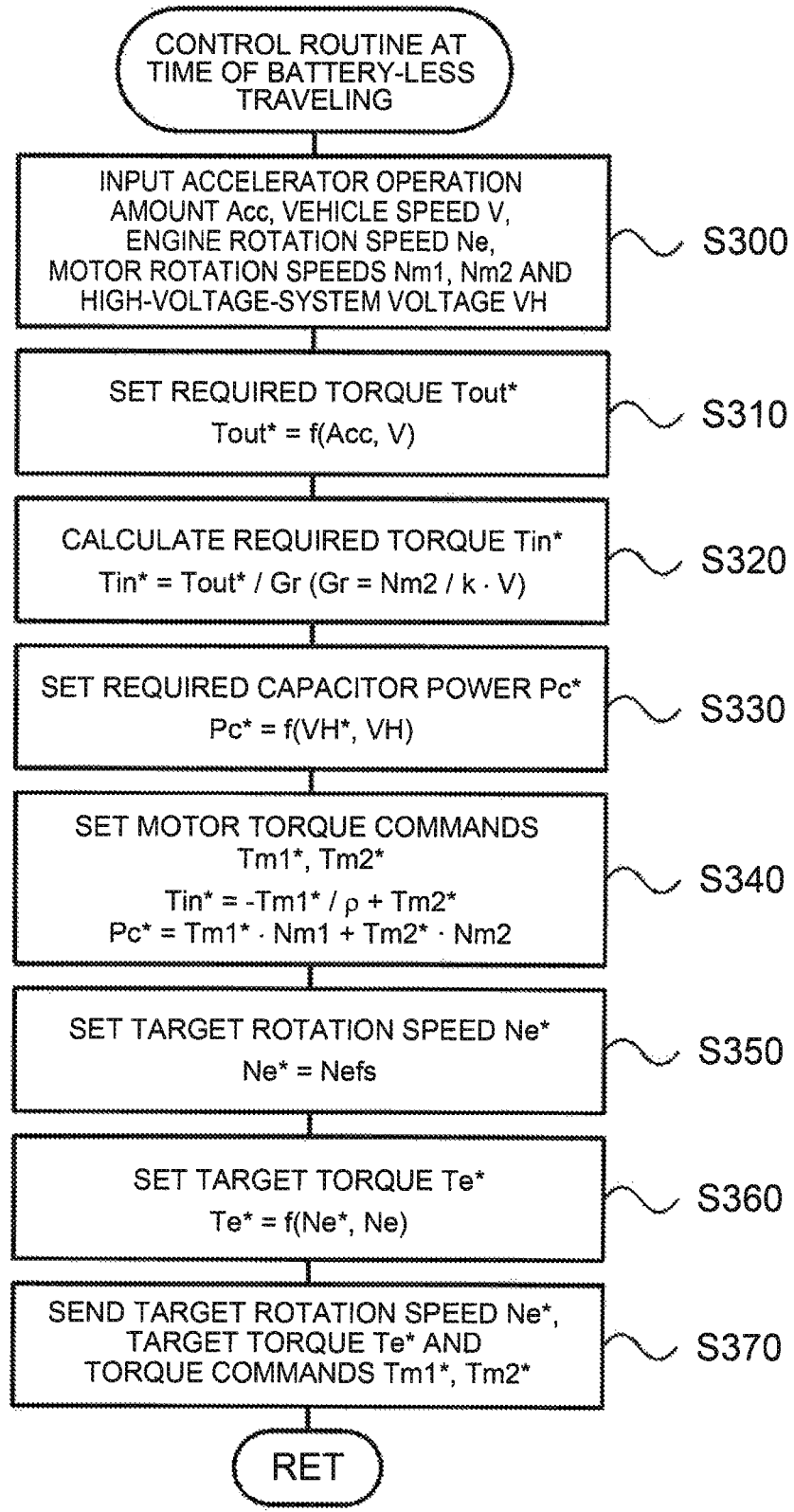
FIG. 4 is a flowchart showing an exemplary control routine at the time of a battery-less traveling.

FIG. 4 is a flowchart showing an exemplary control routine at the time of the battery-less traveling, and the routine is executed by the CPU 72 of the HV ECU 70. In the control routine at the time of the battery-less traveling, the CPU 72 of the HV ECU 70 inputs data necessary for the control of, for example, the accelerator operation amount Acc, the vehicle speed V, the engine speed Ne, the motor rotation speeds Nm1, Nm2 and the high-voltage-system voltage VH (step S300). Subsequently, the required torque Tout* to be output to the drive shaft 36 is set based on the input accelerator operation amount Acc and vehicle speed V (step S310). Then, the required torque Tin* to be output to the input shaft 61 of the transmission 60 is calculated by dividing the required torque Tout* by the gear ratio Gr of the transmission 60 (step S320). As described above, the gear ratio Gr of the transmission 60 can be calculated by dividing the rotation speed of the input shaft 61 of the transmission 60, that is, the rotation speed Nm2 of the motor MG2, by the rotation speed Nout of the drive shaft 36. The rotation speed Nout of the drive shaft 36 can be calculated by multiplying the vehicle speed V by the conversion factor k.

Next, a required capacitor power Pc* with which the capacitor 57 of the high-voltage-system electric power line 54 should be charged and discharged is set by a feedback control such that the high-voltage-system voltage VH becomes the voltage command VH* (step S330). Here, the voltage command VH* is set to the predetermined voltage VHset higher than the battery voltage VB, in step S180 of the control routine at the time of the abnormality of the boost converter. Accordingly, the required capacitor power Pc* is set to an electric power necessary to make the high-voltage-system voltage VH higher than the battery voltage VB.

Subsequently, the torque commands Tm1*, Tm2* of the motors MG1, MG2 are set such that both the relation of the following Formula (1) and the relation of the following Formula (2) are satisfied (step S340). Here, the relation of Formula (1) is a relation in which the required torque Tin* is the sum of the torque (direct torque) to be output from the motor MG1 when the motor MG1 is driven at the torque command Tm1* and to be applied to the input shaft 61 of the transmission 60 through the planetary gear 30 and the torque to be output from the motor MG2. The relation of Formula (2) is a relation in which the required capacitor power Pc* is the sum of a power to be generated (or consumed) by the motor MG1 and a power to be consumed (or generated) by the motor MG2.

$$Tin^* = -Tm1^*/\rho + Tm2^* \quad (1)$$

$$Pc^* = Tm1'^* \cdot Nm1 + Tm2^* \cdot Nm2 \quad (2)$$

Then, the target rotation speed Ne* of the engine 22 is set to a predetermined rotation speed Nefs (for example, 2000 rpm) (step S350), and the target torque Te* of the engine 22 is set by a feedback control, such that the rotation speed Ne of the engine 22 becomes the target rotation speed Ne* (step S360). After the target rotation speed Ne*, the target torque Te* and the torque commands Tm1*, Tm2* are set in this way, the target rotation speed Ne*, the target torque Te* and an autonomous operation command are sent to the engine ECU 24, and the torque commands Tm1*, Tm2* are sent to the motor ECU 40 (step S370). Then, the control routine at the time of the battery-less traveling is ended. The engine ECU 24 executes the intake air amount control, the fuel injection control and the ignition control for the engine 22, such that the engine 22 operates at the predetermined rotation speed Nefs in an autonomous manner by the output of the target torque Te* based on the feedback control. Thereby, even if the torque to be input to and output from the motor MG1 is changed, the engine 22 can be kept at the predetermined rotation speed Nefs. In the above, the control routine at the time of the battery-less traveling has been described.

Back to step S190 of the control routine at the time of the abnormality of the boost converter, when the battery-less traveling is executed in this way, the high-voltage-system voltage VH, the battery voltage VB and the battery current IB are input (step S200), and it is determined whether the input battery current IB is a negative value, that is, whether a charging current is flowing through the battery 50 (step S210), and whether the high-voltage-system voltage VH nearly coincides with the battery voltage VB (step S220). These processes are processes for determining whether the upper arm (the transistor T31) of the boost converter 55 has a short-circuit malfunction.

Figure 5A:
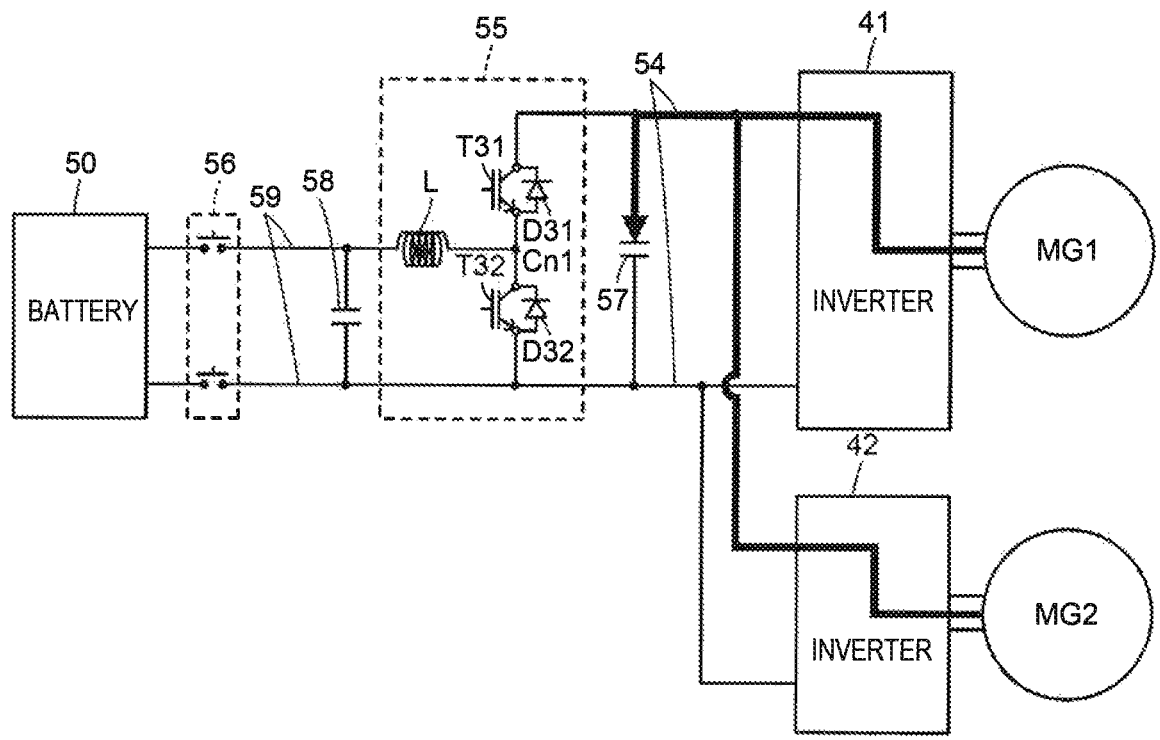
FIG. 5A is an explanatory diagram showing a flow of electric power based on reverse voltages of the motors MG1, MG2 when an upper arm of the boost converter 55 has not been short-circuited at the time of the battery-less traveling.
Figure 5B:
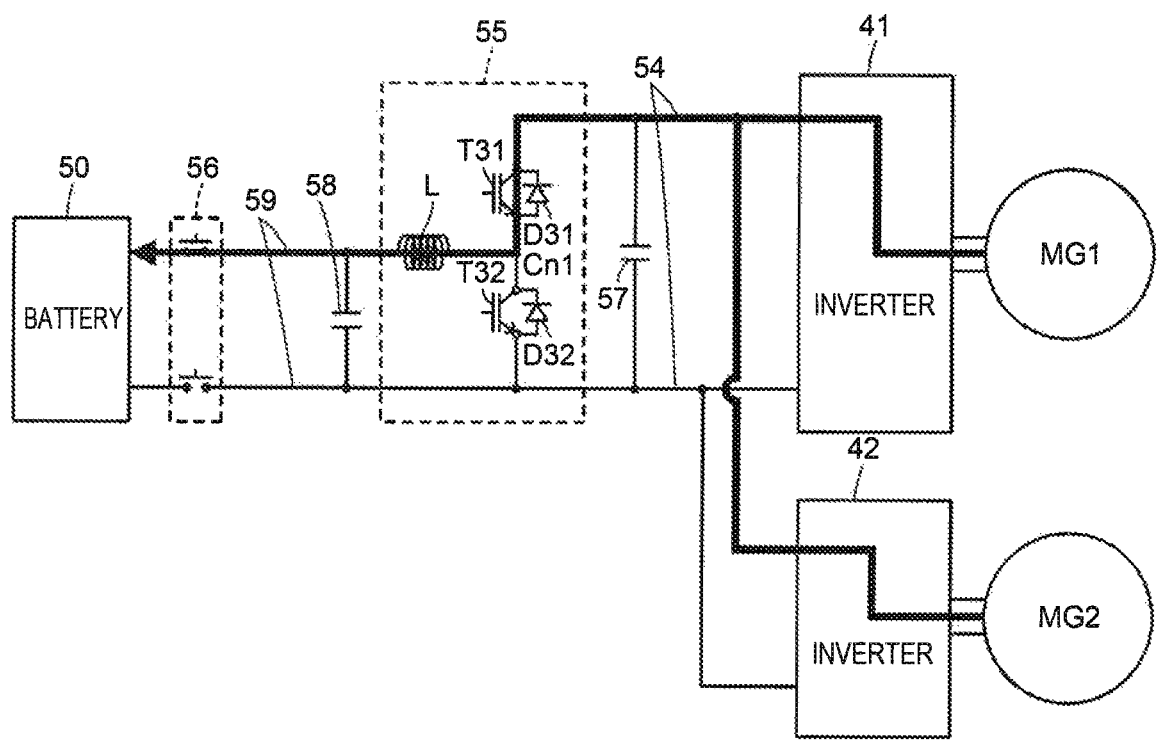
FIG. 5B is an explanatory diagram showing a flow of electric power based on reverse voltages of the motors MG1, MG2 when the upper arm of the boost converter 55 has been short-circuited at the time of the battery-less traveling.

FIG. 5A and FIG. 5B are explanatory diagrams showing flows of electric power based on the reverse voltage of the motors MG1, MG2 at the time of the battery-less traveling. FIG. 5A shows a flow of the electric power based on the reverse voltage when the upper arm of the boost converter 55 has not been short-circuited, and FIG. 5B shows a flow of the electric power based on the reverse voltage when the upper arm of the boost converter 55 has been short-circuited. When the upper arm (the transistor T31) of the boost converter 55 has not been short-circuited, the upper arm is opened by the shut-off of the gate of the boost converter 55, and therefore, the battery 50 is separated from the high-voltage-system electric power line 54 (the motors MG1, MG2). Therefore, when the voltage command VH* of the capacitor 57 of the high-voltage-system electric power line 54 is set so as to be higher than the battery voltage VB and the battery-less traveling is executed, the electric power based on the reverse voltage generated in the motors MG1, MG2 is supplied to the capacitor 57, so that the capacitor 57 is charged. Accordingly, the voltage of the capacitor 57 becomes higher than the battery voltage VB. On the other hand, when the upper arm of the boost converter 55 has been short-circuited, the upper arm is not opened by the shut-off of the gate, and therefore, the battery 50 is kept connected to the high-voltage-system electric power line 54 through the upper arm of the boost converter 55. In this case, even if the voltage command VH* of the capacitor 57 of the high-voltage-system electric power line 54 is set so as to be higher than the battery voltage VB, the electric power based on the reverse voltage generated in the motors MG1, MG2 is supplied to the battery 50. Therefore, the battery 50 is charged, and the voltage of the capacitor 57 nearly coincides with the battery voltage VB. Accordingly, during the battery-less traveling, it is determined whether a charging current is flowing through the battery 50, and it is determined whether the voltage (the high-voltage-system voltage) VH of the capacitor 57 nearly coincides with the battery voltage VB. Thereby, it is possible to determine whether the upper arm of the boost converter 55 has a short-circuit malfunction.

When it is determined in step S210 that the battery current IB is not a negative value or when it is determined in step S220 that the high-voltage-system voltage VH does not nearly coincide with the battery voltage VB, the routine returns to step S190 and continues the battery-less traveling. On the other hand, when it is determined that the battery current IB is a negative value or when it is determined that the high-voltage-system voltage VH nearly coincides with the battery voltage VB, it is determined that the upper arm of the boost converter 55 has a short-circuit malfunction, and an advantage traveling is executed until a predetermined time elapses (steps S230, S240). Then, the same upper arm ON traveling as the above-described upper arm ON traveling in step S140 is executed (step S250). Here, the advantage traveling is executed for resetting the operation state of the engine 22 and the drive state of the motors MG1, MG2 due to the battery-less traveling.

FIG. 6 is a flowchart showing an exemplary control routine at the time of the advantage traveling, and the routine is executed by the CPU 72 of the HV ECU 70. In the control routine at the time of the advantage traveling, the CPU 72 of the HV ECU 70, first, sends a gate shut-off command for shutting off the gate of the inverter 41 that drives the motor MG1, to the motor ECU 40 (step S400), and sends a gate shut-off command for shutting off the gate of the inverter 42 that drives the motor MG2, to the motor ECU 40 (step S410). Then, the target rotation speed Ne of the engine 22 is set to a predetermined rotation speed Neidle (for example, 800 rpm) (step S420), and the target rotation speed Ne and a self-sustained operation command are sent to the engine ECU 24 (step S430). Then, the control routine at the time of the advantage traveling is ended. Thereby, the hybrid vehicle 20 travels while torque is not input to and output from the motors MG1, MG2 and the engine 22 operates at the predetermined rotation speed Neidle in a self-sustained manner (no-load operation).

FIG. 7 is an explanatory diagram showing control methods for the motors MG1, MG2 and the engine in the respective limp home modes. As illustrated, in the battery-less traveling, the motors MG1, MG2 are controlled by the feedback control such that the voltage (the high-voltage-system voltage) VH of the capacitor 57 becomes the voltage command VH*, and the engine 22 is controlled by the feedback control such that the engine 22 operates at the predetermined rotation speed Nefs in an autonomous manner. In the advantage traveling, the gates of the inverters 41, 42 for the motors MG1, MG2 are shut off, and the engine 22 is controlled such that the engine 22 operates at the predetermined rotation speed Neidle in a self-sustained manner (no-load operation). In the upper arm ON traveling, similarly to the normal time, the motor MG1 is controlled by the feedback control such that the rotation speed Ne of the engine 22 becomes the target rotation speed Ne*, the motor MG2 is controlled such that the required torque Tin* is output to the input shaft 61, and the engine 22 is controlled so as to output the power for which the required power Pin* for the input shaft 61 and the required charge-discharge power Pb* of the battery 50 are considered. Thus, the battery-less traveling and the upper arm ON traveling are greatly different from each other, in the drive control of the motors MG1, MG2 and the operation control of the engine 22. Therefore, in the case of a direct transition from the battery-less traveling to the upper arm ON traveling, there is a possibility that the motor torque or the engine power suddenly changes in the process of the transition, so that an unexpected high driving power is output to the drive shaft 36, or the power management among the motors MG1, MG2 and the battery 50 fails. In the embodiment, the hybrid vehicle 20 transitions from the battery-less traveling to the upper arm ON traveling through the advantage traveling, and therefore, it is possible to prevent the occurrence of the above-described disadvantages.

Back to step S250 of the control routine at the time of the abnormality of the boost converter, when the upper arm ON traveling is executed in this way, the high-voltage-system voltage VH and the battery voltage VB are input (step S260), and it is determined whether the high-voltage-system voltage VH is higher than the battery voltage VB (step S270). When it is determined that the high-voltage-system voltage VH is equal to or lower than the battery voltage VB, the routine returns to step S250, and continues the upper arm ON traveling. When it is determined that the high-voltage-system voltage VH is higher than the battery voltage VB, the routine transitions to a motor traveling with only discharge (step S280). The motor traveling with only discharge can be executed by the same control as the control in the EV traveling mode, except that the input limit Win of the battery 50 is set to zero. Thus, even when the short-circuit malfunction of the upper arm (the transistor T31) of the boost converter 55 is determined during the battery-less traveling and the upper arm ON traveling is executed, if the high-voltage-system voltage VH becomes higher than the battery voltage VB thereafter, it is determined that the upper arm of the boost converter 55 does not has a short-circuit malfunction but has an open malfunction, and the transition to the motor traveling with only discharge is made.

The above-described hybrid vehicle 20 according to the embodiment, when the boost converter 55 has an abnormality, executes the battery-less traveling by shutting off the gate of the boost converter 55 and setting the voltage command VH* of the capacitor 57 (the high-voltage-system electric power line 54) to the predetermined voltage VHset higher than the battery voltage VB. When the gate of the boost converter 55 is shut off, if the upper arm (the transistor T31) has not been short-circuited, the upper arm is opened and the battery 50 is separated from the motor MG1 and the motor MG2. Therefore, by the execution of the battery-less traveling, the voltage (the high-voltage-system voltage) VH of the capacitor 57 becomes higher than the battery voltage VB. On the other hand, if the upper arm is short-circuited, the upper arm is not opened even by the shut-off of the gate of the boost converter 55. Therefore, even if the battery-less traveling is executed such that the voltage of the capacitor 57 becomes higher than the battery voltage VB, the electric power based on the reverse voltage generated in the motor MG1 or the motor MG2 is supplied to the battery 50 through the upper arm of the boost converter 55, so that the battery 50 is charged and the voltage of the capacitor 57 approaches the battery voltage VH. Accordingly, during the battery-less traveling, when it is determined that a charging current has flowed through the battery 50 or when it is determined that the voltage (the high-voltage-system voltage) VH of the capacitor 57 has approached the battery voltage VB, it is determined that the upper arm of the boost converter 55 has a short-circuit malfunction. Thereby, it is possible to more properly determine the short-circuit malfunction of the upper arm.

Furthermore, when it is determined that the upper arm of the boost converter 55 has a short-circuit malfunction during the battery-less traveling, the hybrid vehicle 20 according to the embodiment transitions to the upper arm ON traveling with the charge and discharge of the battery 50. Thereby, when the hybrid vehicle 20 travels in a limp home mode, it is possible to secure a sufficient travel distance by the upper arm ON traveling.

Further, when it is determined that the upper arm of the boost converter 55 has a short-circuit malfunction during the battery-less traveling, the hybrid vehicle 20 according to the embodiment transitions to the upper arm ON traveling after the advantage traveling in which the gates of the inverters 41, 42 for the motors MG1, MG2 are shut off and the engine 22 operates at the predetermined rotation speed Neidle in a self-sustained manner. Thereby, at the time of the transition from the battery-less traveling to the advantage traveling, it is possible to prevent the output of an unexpected high driving power to the drive shaft 36 and the failure of the power management among the motors MG1, MG2 and the battery 50.

Further, when the motor reverse voltage Vm is higher than the battery voltage VB, the hybrid vehicle 20 according to the embodiment determines whether the upper arm of the boost converter 55 has a short-circuit malfunction, based on whether the deviation (Vm−VH) between the motor reverse voltage Vm and the high-voltage-system voltage VH is higher than the threshold Vref. Thereby, when the motor reverse voltage Vm is higher than the battery voltage VB, it is possible to determine the short-circuit malfunction of the upper arm of the boost converter 55, without executing the battery-less traveling.

In the embodiment, whether the upper arm (the transistor T31) of the boost converter 55 has a short-circuit malfunction is determined by executing the determination of whether the battery current IB is a negative value and the determination of whether the high-voltage-system voltage VH nearly coincides with the battery voltage VB during the battery-less traveling. However, whether the upper arm has a short-circuit malfunction may be determined based on only one of the determinations.

In the embodiment, at the time of the transition from the battery-less traveling to the upper arm ON traveling, the hybrid vehicle 20 passes through the advantage traveling. However, the hybrid vehicle 20 may transition from the battery-less traveling to the upper arm ON traveling directly, without passing through the advantage traveling.

In the embodiment, when it is determined that the high-voltage-system voltage VH is higher than the battery voltage VB, the control routine at the time of the abnormality of the boost converter transitions to the motor traveling with only discharge, even after the transition to the upper arm ON traveling based on the determination that the upper arm of the boost converter 55 has been short-circuited during the battery-less traveling. However, it is allowed not to execute such a determination and the transition to the motor traveling with only discharge after the transition to the upper arm ON traveling based on the determination that the upper arm of the boost converter 55 has been short-circuited during the battery-less traveling.

In the embodiment, the ring gear of the planetary gear 30 is connected to the drive shaft 36 through the transmission 60. However, the ring gear of the planetary gear 30 may be connected directly to the drive shaft 36. Also in this case, in a low speed region in which the rotation speed of the motor MG1 or the motor MG2 is low, the motor reverse voltage Vm can be equal to or lower than the battery voltage VB, and therefore, it is possible to properly determine whether the upper arm of the boost converter 55 has a short-circuit malfunction, by the transition to the battery-less traveling when the boost converter 55 has an abnormality.

The correspondence relation between major elements of the embodiment and major elements of the disclosure described in SUMMARY will be described. In the embodiment, the engine 22 is an example of the "engine", the motor MG1 is an example of the "first motor", the motor MG2 is an example of the "second motor", the planetary gear 30 is an example of the "planetary gear mechanism", the inverter 41 is an example of the "first inverter", the inverter 42 is an example of the "second inverter", the battery 50 is an example of the "electric storage device", the boost converter 55 is an example of the "boost converter", the transistor T31 is an example of the "first transistor", the transistor T32 is an example of the "second transistor", the reactor L is an example of the "reactor", the capacitor 57 is an example of the "capacitor", and the engine ECU 24, the motor ECU 40 and the HV ECU 70 is an example of the "electronic control unit".

Here, the correspondence relation between the major elements of the embodiment and the major elements of the disclosure described in SUMMARY does not limit the elements of the disclosure described in SUMMARY, because the embodiment is one example for specifically describing a mode for carrying out the disclosure described in SUMMARY. That is, the disclosure described in SUMMARY should be interpreted based on the description in SUMMARY, and the embodiment is just one specific example of the disclosure described in SUMMARY.

Thus, a mode for carrying out the disclosure has been described with use of the embodiment. Naturally, the disclosure is not limited to the embodiment at all, and various modes can be carried out without departing from the spirit of the disclosure.

The disclosure can be utilized in a manufacturing industry for hybrid vehicles.

What is claimed is:
1. A hybrid vehicle comprising:
an engine;
a first motor;
a planetary gear mechanism including three rotational elements connected to the engine, the first motor and a drive shaft linked to an axle;
a second motor configured to exchange driving power with the drive shaft;
a first inverter configured to drive the first motor;
a second inverter configured to drive the second motor, the second inverter including a positive bus-bar and a negative bus-bar in common with the first inverter;
an electric storage device including a negative electrode terminal connected to the negative bus-bar;

a boost converter including a first transistor, a first diode, a second transistor, a second diode and a reactor, the first transistor connected to the positive bus-bar and serving as an upper arm, the first diode connected in parallel to the first transistor in an inverse direction, the second transistor connected to the first transistor and the negative bus-bar and serving as a lower arm, the second diode connected in parallel to the second transistor in an inverse direction, the reactor connected to a positive electrode terminal of the electric storage device and a connection point between the first transistor and the second transistor, the boost converter configured to adjust a voltage on a side of the first inverter and the second inverter to equal to or higher than a voltage on a side of the electric storage device;

a smoothing capacitor connected to the positive bus-bar and the negative bus-bar; and an electronic control unit configured to execute a battery-less traveling when the electronic control unit determines that the boost converter has an abnormality, the battery-less traveling being a traveling in which the hybrid vehicle travels while the boost converter is shut off and the first motor and the second motor are driven such that a voltage of the capacitor is higher than the voltage of the electric storage device, the electronic control unit configured to determine that the upper arm of the boost converter has been short-circuited, when the electronic control unit makes at least one of a determination that the electric storage device has been charged and a determination that the voltage of the capacitor has approached the voltage of the electric storage device, while the electronic control unit is executing the battery-less traveling.

2. The hybrid vehicle according to claim 1, wherein the electronic control unit is configured to control the hybrid vehicle to an upper arm ON traveling when the electronic control unit determines that the upper arm of the boost converter has been short-circuited, the upper arm ON traveling being a traveling in which the hybrid vehicle travels with charge and discharge of the electric storage device while the upper arm of the boost converter is in an ON state.

3. The hybrid vehicle according to claim 2, wherein the electronic control unit is configured to control the hybrid vehicle from the battery-less traveling to the upper arm ON traveling through a traveling state in which gates of the first inverter and the second inverter are shut off and the engine operates in a self-sustained manner when the electronic control unit determines that the upper arm of the boost converter has been short-circuited.

4. The hybrid vehicle according to claim 1, wherein the electronic control unit is configured to determine whether the upper arm of the boost converter has been short-circuited based on a voltage difference between the voltage of the capacitor and a reverse voltage of at least one of the first motor and the second motor when the electronic control unit determines that the reverse voltage is higher than the voltage of the electric storage device, and the electronic control unit is configured to execute the battery-less traveling and determine whether the upper arm of the boost converter has been short-circuited based on at least one of the determination that the electric storage device has been charged and the determination that the voltage of the capacitor has approached the voltage of the electric storage device, when the electronic control unit determines that the reverse voltage is equal to or lower than the voltage of the electric storage device.

5. The hybrid vehicle according to claim 4, further comprising a transmission including an input shaft connected to the rotational element of the planetary gear mechanism and configured to transmit driving power between the input shaft and the drive shaft with change in gear ratio, the input shaft of the transmission connected to the second motor.

6. A control device for a hybrid vehicle, the hybrid vehicle including:

an engine;

a first motor;

a planetary gear mechanism including three rotational elements connected to the engine, the first motor and a drive shaft linked to an axle;

a second motor configured to exchange driving power with the drive shaft;

a first inverter configured to drive the first motor;

a second inverter configured to drive the second motor, the second inverter including a positive bus-bar and a negative bus-bar in common with the first inverter, an electric storage device including a negative electrode terminal connected to the negative bus-bar;

a boost converter including a first transistor, a first diode, a second transistor, a second diode and a reactor, the first transistor connected to the positive bus-bar and serving as an upper arm, the first diode connected in parallel to the first transistor in an inverse direction, the second transistor connected to the first transistor and the negative bus-bar and serving as a lower arm, the second diode connected in parallel to the second transistor in an inverse direction, the reactor connected to a positive electrode terminal of the electric storage device and a connection point between the first transistor and the second transistor, the boost converter configured to adjust a voltage on a side of the first inverter and the second inverter to equal to or higher than a voltage on a side of the electric storage device; and a smoothing capacitor connected to the positive bus-bar and the negative bus-bar, the control device comprising an electronic control unit, the electronic control unit configured to execute a battery-less traveling when the electronic control unit determines that the boost converter has an abnormality, the battery-less traveling being a traveling in which the hybrid vehicle travels while the boost converter is shut off and the first motor and the second motor are driven such that a voltage of the capacitor is higher than the voltage of the electric storage device, the electronic control unit configured to determine that the upper arm of the boost converter has been short-circuited, when the electronic control unit makes at least one of a determination that the electric storage device has been charged and a determination that the voltage of the capacitor has approached the voltage of the electric storage device, while the electronic control unit is executing the battery-less traveling.

7. A control method for a hybrid vehicle, the hybrid vehicle including:

an engine;

a first motor;

a planetary gear mechanism including three rotational elements connected to the engine, the first motor and a drive shaft linked to an axle;

a second motor configured to exchange driving power with the drive shaft;

a first inverter configured to drive the first motor;

a second inverter configured to drive the second motor, the second inverter including a positive bus-bar and a negative bus-bar in common with the first inverter;

an electric storage device including a negative electrode terminal connected to the negative bus-bar;

a boost converter including a first transistor, a first diode, a second transistor, a second diode and a reactor, the first transistor connected to the positive bus-bar and serving as an upper arm, the first diode connected in parallel to the first transistor in an inverse direction, the second transistor connected to the first transistor and the negative bus-bar and serving as a lower arm, the second diode connected in parallel to the second transistor in an inverse direction, the reactor connected to a positive electrode terminal of the electric storage device and a connection point between the first transistor and the second transistor, the boost converter configured to adjust a voltage on a side of the first inverter and the second inverter to equal to or higher than a voltage on a side of the electric storage device;

a smoothing capacitor connected to the positive bus-bar and the negative bus-bar; and an electronic control unit, the control method comprising:

executing, by the electronic control unit, a battery-less traveling when the electronic control unit determines that the boost converter has an abnormality, the battery-less traveling being a traveling in which the hybrid vehicle travels while the boost converter is shut off and the first motor and the second motor are driven such that a voltage of the capacitor is higher than the voltage of the electric storage device; and determining, by the electronic control unit, that the upper arm of the boost converter has been short-circuited, when the electronic control unit makes at least one of a determination that the electric storage device is being charged and a determination that the voltage of the capacitor is close to the voltage of the electric storage device, while the electronic control unit is executing the battery-less traveling.

* * * * *